United States Patent
Ohara

(10) Patent No.: US 9,213,514 B2
(45) Date of Patent: Dec. 15, 2015

(54) NON-TRANSITORY COMPUTER-READABLE MEDIUM, COMMUNICATION RELAYING METHOD, INFORMATION PROCESSING APPARATUS, AND IMAGE PROCESSING APPARATUS

(71) Applicant: Kiyotaka Ohara, Nagoya (JP)

(72) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/083,481

(22) Filed: Nov. 19, 2013

(65) Prior Publication Data

US 2014/0139877 A1    May 22, 2014

(30) Foreign Application Priority Data

Nov. 19, 2012    (JP) ................. 2012-253290

(51) Int. Cl.
  *G06F 3/12*    (2006.01)
  *G06K 15/02*    (2006.01)
(52) U.S. Cl.
  CPC ............ *G06F 3/1293* (2013.01); *G06F 3/1209* (2013.01); *G06F 3/1236* (2013.01); *G06F 3/1284* (2013.01); *G06K 15/183* (2013.01)
(58) Field of Classification Search
  None
  See application file for complete search history.

(56) References Cited

U.S. PATENT DOCUMENTS

| | | | |
|---|---|---|---|
| 5,580,177 A | 12/1996 | Gase et al. | |
| 6,931,456 B2 | 8/2005 | Payne et al. | |
| 7,295,338 B2 | 11/2007 | Satake et al. | |
| 7,576,879 B2 * | 8/2009 | Ohara | 358/1.15 |
| 8,228,531 B2 | 7/2012 | Kanamori | |
| 8,458,292 B2 | 6/2013 | Polis et al. | |
| 9,001,356 B2 * | 4/2015 | Tsujimoto | 358/1.15 |
| 2002/0080391 A1 | 6/2002 | Sugiura et al. | |
| 2003/0030843 A1 | 2/2003 | Qiao | |
| 2003/0197890 A1 | 10/2003 | Satake et al. | |
| 2003/0227641 A1 | 12/2003 | Edmonds et al. | |
| 2004/0190042 A1 | 9/2004 | Ferlitsch et al. | |
| 2004/0252333 A1 | 12/2004 | Blume et al. | |

(Continued)

FOREIGN PATENT DOCUMENTS

| | | |
|---|---|---|
| JP | 2003-316712 A | 11/2003 |
| JP | 2010-176580 A | 8/2010 |
| JP | 2011-257945 A | 12/2011 |

OTHER PUBLICATIONS

Andrew R. Mitchell, IPP USB Specification (IPP over USB), Version 1.0 Draft 20 Apr. 29, 2011.*

(Continued)

*Primary Examiner* — Hilina K Demeter
(74) *Attorney, Agent, or Firm* — Banner & Witcoff, Ltd.

(57) ABSTRACT

A communication relaying method, which is used in an information processing apparatus that is communicated to an image processing apparatus through a first communication interface, the method comprising: processes data, which is transmitted to and received from the image processing apparatus by execution of an application program, according to a particular protocol in accordance with transmission/reception through a second communication interface different from the first communication interface; registering a predetermined own-device address to feed transmission data according to the protocol, back to the information processing apparatus; and transmitting, in a case where the transmission destination address of transmission data processed by the processing is the own-device address transmit the transmission data through the first communication interface.

6 Claims, 7 Drawing Sheets

(56) References Cited

U.S. PATENT DOCUMENTS

| | | | |
|---|---|---|---|
| 2005/0141007 A1 | 6/2005 | Shirai et al. | |
| 2005/0248803 A1* | 11/2005 | Ohara | 358/1.15 |
| 2007/0003308 A1 | 1/2007 | Kim | |
| 2007/0268838 A1 | 11/2007 | Moon | |
| 2008/0297833 A1 | 12/2008 | Hatakeyama | |
| 2011/0019226 A1 | 1/2011 | Tsujimoto | |
| 2011/0292424 A1 | 12/2011 | Murata | |
| 2011/0302512 A1 | 12/2011 | Ishii | |
| 2012/0026548 A1 | 2/2012 | Nakagawa | |
| 2012/0133967 A1 | 5/2012 | Yasui | |
| 2013/0201519 A1* | 8/2013 | Duyk et al. | 358/1.15 |
| 2014/0139877 A1 | 5/2014 | Ohara | |

OTHER PUBLICATIONS

Andrew R. Mitchell, IPP USB Specification (IPP over USB), Version 1.0 Draft 20 revised May 10, 2011.

Co Pending U.S. Appl. No. 14/083,497, filed Nov. 19, 2013.
Co Pending U.S. Appl. No. 14/083,478, filed Nov. 19, 2013.
Extended European Search Report issued in corresponding European Patent Application No. 13193544.7 dated Jun. 30, 2014.
Andrew R. Mitchell, "IPP USB Specification (IPP over USB)", Version 1.0 Draft 19, dated Apr. 29, 2011; Retrieved from the Internet: URL:ftp.pwg.org/pub/pwg/ipp/whitepaper/draft-ippusbspecification-20110428.pdf [retrieved on May 28, 2014]; 20 pages.
Jan. 28, 2015—(US) Non-Final Office Action—U.S. Appl. No. 14/083,478.
Mar. 12, 2015—(US) Non-Final Office Action—U.S. Appl. No. 14/083,497.
Jun. 9, 2015—(US) Notice of Allowance—U.S. Appl. No. 14/083,478.
Aug. 20, 2015—(US) Final Office Action—U.S. Appl. No. 14/083,497.

* cited by examiner

FIG. 3

CLIENT-SIDE PRINTER PROXY MANAGEMENT DATA

| USB NUMBER | PRINTER NAME | PORT NUMBER |
|---|---|---|
| 1 | NPR-1234 | 50001 |
| 2 | PR-3456 | 50002 |
| 3 | MFP-4567 | 50003 |

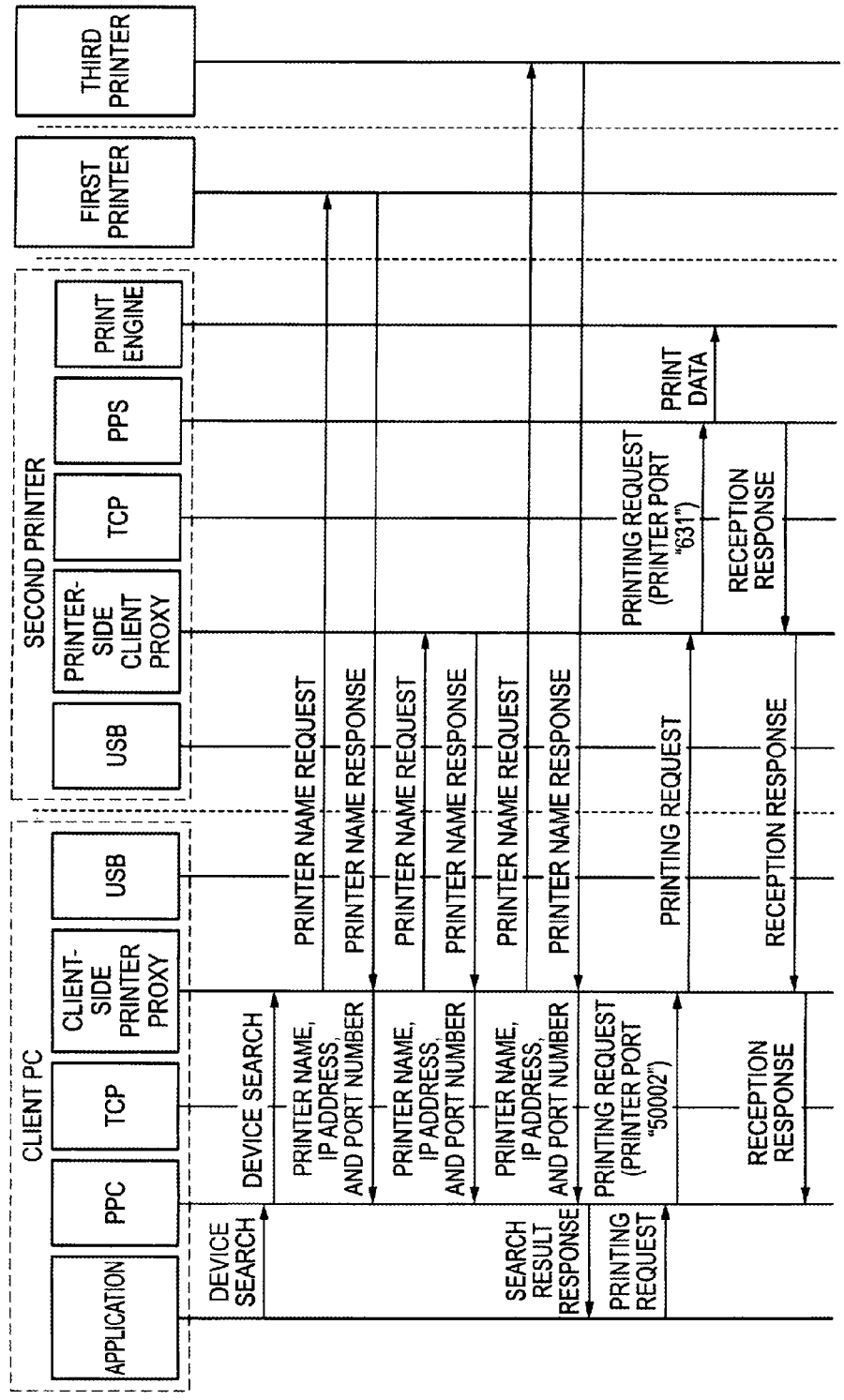

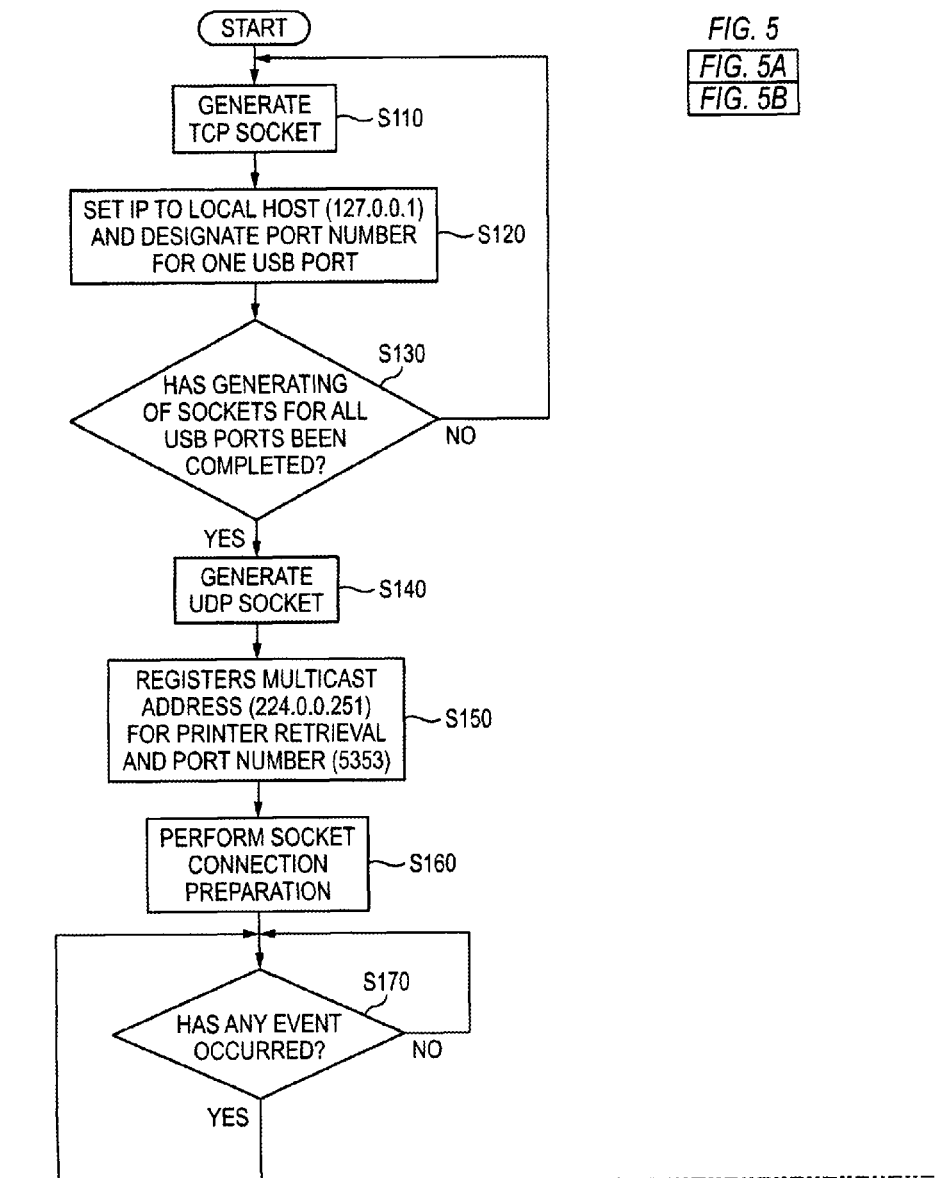

NON-TRANSITORY COMPUTER-READABLE MEDIUM, COMMUNICATION RELAYING METHOD, INFORMATION PROCESSING APPARATUS, AND IMAGE PROCESSING APPARATUS

CROSS-REFERENCE TO RELATED APPLICATION

This application claims priority from Japanese Patent Application No. 2012-253290 filed on Nov. 19, 2012, the entire subject matter of which is incorporated herein by reference.

TECHNICAL FIELD

This disclosure relates to a communication relaying technology.

BACKGROUND

There is an image processing apparatus having a web server function and displaying a setting screen and the like of the image processing apparatus on a web browser executed in a client terminal such as an information processing apparatus. Also, there is a standard referred to as Internet Printing Protocol (IPP) for transmitting and receiving a variety of data such as print data and control information between an image processing apparatus and a client terminal through a Transmission Control Protocol/Internet Protocol (TCP/IP) network such as the Internet.

Further, there is a draft of a standard for performing communication based on the above described IPP through a Universal Serial Bus (USB) interface in an environment where an image processing apparatus and a client terminal are connected by the USB and is referred to as "IPP-over-USB".

SUMMARY

However, in the current draft of the "IPP-over-USB" standard, it is not specifically described how to transmit transmission data processed in the procedure of the IPP through a USB interface. Also, it is not described how to transmit reception data of the IPP received through a USB interface to an IPP processing section.

In view of the above, this disclosure provides at least a specific mechanism to transmit and receive data of a particular protocol (for example, the IPP) through a specific communication interface (for example, a USB) using a method different from a communication interface in accordance with the particular protocol while suppressing modifications on existing software for transmitting and receiving data by the particular protocol.

A non-transitory computer-readable medium according to this disclosure has instructions, which is executed by an information processing apparatus The information processing apparatus includes: a transceiver section configured to communicate to an image processing apparatus through a first communication interface; and a transmission/reception data processing section configured to process transmission/reception data, which is transmitted to and received from the image processing apparatus by execution of an application program, according to a particular protocol in accordance with transmission/reception through a second communication interface different from the first communication interface.

The instruction causes the information processing apparatus to function as: a own-device address registering section that registers a predetermined own-device address to feed transmission data according to the protocol, back to the information processing apparatus; and a data transmission control section that controls, in a case where the transmission destination address of transmission data processed by the transmission/reception data processing section is the own-device address, the transceiver section to transmit the transmission data.

According to this configuration, the own-device address is registered in the information processing apparatus, and if data is transmitted from an application to the own-device address, the transmission data is processed according to the above described protocol and is transmitted from the first communication interface by the data transmission control section.

A non-transitory computer-readable medium according to another aspect of this disclosure has instructions, which is executed by an image processing apparatus. The image processing apparatus includes: a transceiver section configured to communicate to an information processing apparatus through a first communication interface; and a transmission/reception data processing section configured to process data, which is transmitted to and received from the information processing apparatus, according to a particular protocol in accordance with transmission/reception through a second communication interface different from the first communication interface.

The instruction causes the image processing apparatus to function as: a own-device address registering section that registers a predetermined own-device address to feed transmission data according to the protocol, back to the image processing apparatus; and a data transmission control section that controls, in a case where the transmission destination address of transmission data processed by the transmission/reception data processing section is the own-device address, the transceiver section to transmit the transmission data.

According to this configuration, the own-device address is registered in the image processing apparatus, and if data is transmitted to the own-device address, the transmission data is processed according to the above described protocol and is transmitted from the first communication interface by the data transmission control section. Also, if data according to the above described protocol is received from the information processing apparatus through the first communication interface, the reception data is transmitted to the transmission/reception data processing section by the data reception control section and is processed.

Therefore, it is possible to transmit data of a particular protocol through a specific communication interface using a method different from a communication line in accordance with the particular protocol while suppressing modifications on existing software (for example, software for implementing a transmission/reception data processing section) for transmitting and receiving data by the particular protocol.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3 is an explanatory view illustrating management data which is managed by a client-side printer proxy of a client PC;

FIG. 4 is a sequence diagram illustrating an operation example of the image information processing system;

DETAILED DESCRIPTION

Hereinafter, an embodiment of this disclosure will be described with reference to the accompanying drawings.

(1) Software Configuration of Image Information Processing System

Figure 1:
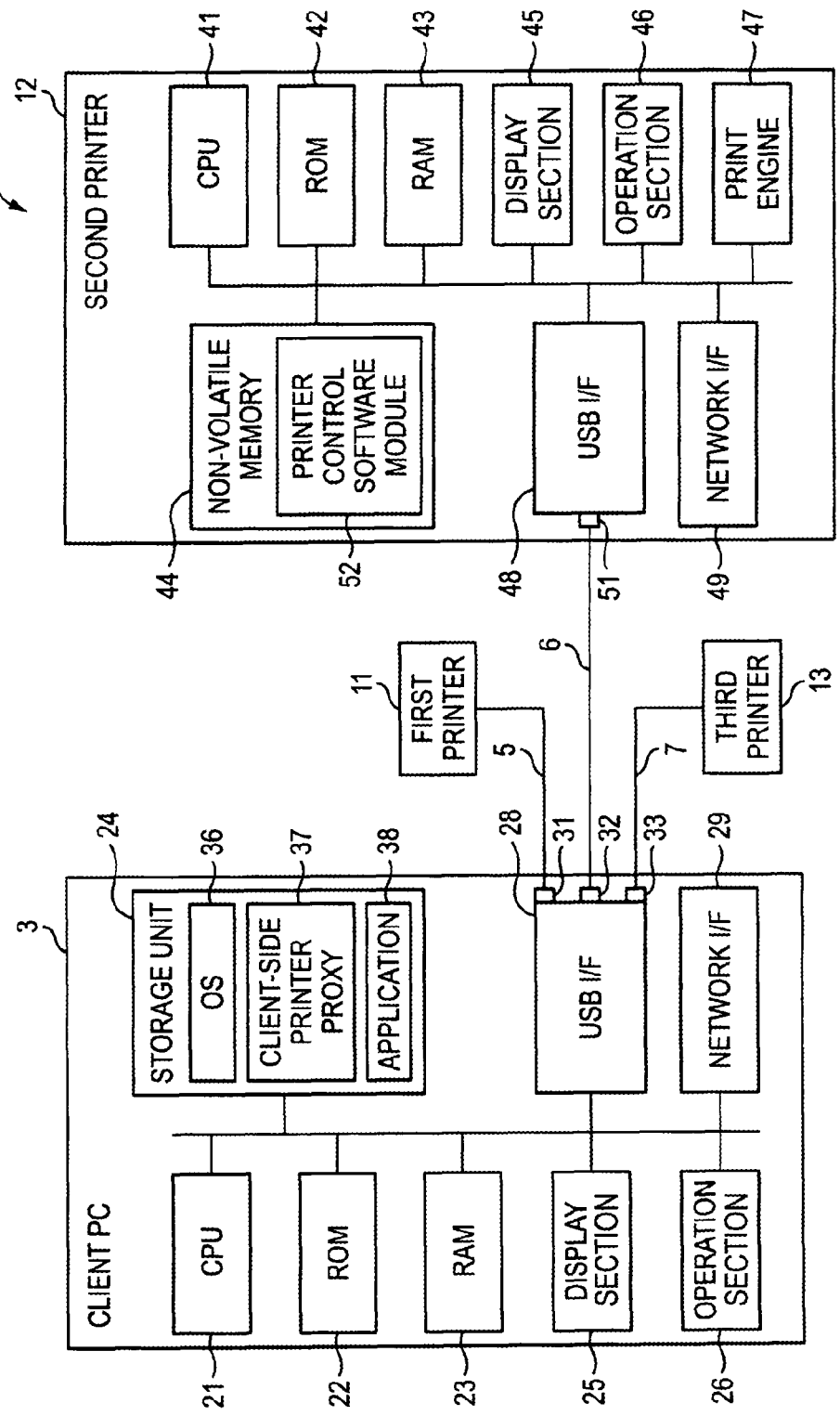
FIG. 1 is a block diagram illustrating a schematic configuration of an image information processing system of an embodiment.

As shown in FIG. 1, an image information processing system 1 of the present embodiment is configured by communicating a client PC 3 with three printers 11, 12, and 13 through USB cables 5, 6, and 7 between the client PC 3 and the printers 11, 12, and 13, respectively.

The client PC 3 serves as an information processing apparatus and has a known configuration including a variety of hardware a CPU 21, a ROM 22, a RAM 23, a storing section 24, a display section 25, an operation section 26, a USB interface (I/F) 28, and a network interface (I/F) 29.

The CPU 21 controls each section of the client PC 3 by executing programs stored in the ROM 22 and the storing section 24. The ROM 22 stores a variety of programs to be executed by the CPU 21, data, and so on. The RAM 23 is used as a main storage section which is used for the CPU 21 to perform a variety of processes. The operation section 26 is configured by a mouse, a keyboard, and so on (not shown) to be operated by a user. The display section 25 is configured by a display such as a liquid crystal display.

The storing section 24 is configured by a storage device such as a hard disk. In the storing section 24, a variety of software is installed. The variety of software includes an operating system (OS) 36, a client-side printer proxy 37, and an application 38. The application 38 is so-called application software such as word processing software and spreadsheet software, and the user can control any one of the printers 11, 12, and 13, such that documents and the like created by using the application 38 are printed. The client-side printer proxy 37 is one of the characteristic software in the image information processing system 1 of the present embodiment, and sets the client PC 3 as a local host (that is, the client PC 3 sets a local host in the client PC 3) such that the client PC 3 serves as a printer as seen from the application 38 or the OS 36.

The USB I/F 28 includes not only a USB host controller but also three USB connection jacks 31, 32, and 33 for connection of USB cables. The USB connection jack 31 of them is connected to the USB connection 5 to be connected to the first printer 11 through the USB cable 5. Another USB connection jack 32 is connected to the USB cable 6 to be connected to the second printer 12 through the USB cable 6. A further USB connection jack 33 is connected to the USB cable 7 to be connected to the third printer 13 through the USB cable 7. That is, the client PC 3 is configured to be able to perform data communication with the three printers 11, 12, and 13 according to a USB standard through the USB cables, respectively. Also, the USB corresponds to an example of a first communication interface of this disclosure.

The network I/F 29 is an interface for connecting the client PC 3 to a network of a standard different from USB, and is configured as an interface for connection with a local area network (LAN) in the present embodiment. This LAN corresponds to an example of a second communication interface of this disclosure. Also, the network I/F 29 may be an interface corresponding to a wired LAN, or may be an interface corresponding to a wireless LAN.

The printers 11, 12, and 13 serving as image processing apparatuses are basically the same in the software configuration and the hardware configuration. Therefore, in FIG. 1, as a representative, only the internal configuration of the second printer 12 is shown, and the internal configurations of the first printer 11 and the third printer 13 are omitted. This is the same in the software configuration of FIG. 2. Therefore, in the following description, with respect to the printers, the second printer 12 will be described in detail, and the other printers 11 and 13 will not be described in detail.

The second printer 12 is an apparatus for printing images onto recording sheets such as printing paper by an electrophotographic system or an inkjet system. The second printer 12 is connected to the client PC 3 through the USB cable 6. Therefore, it is possible to transmit print data of documents and the like created by the application 38 of the client PC 3 to the second printer 12 through the USB cable 6, thereby printing images represented by the print data.

The second printer 12 includes a variety of software such as a CPU 41, a ROM 42, a RAM 43, a non-volatile memory 44, a display section 45, an operation section 46, a print engine 47, a USB I/F 48, and a network I/F 49.

The CPU 41 controls each section of the second printer 12 by executing programs stored in the ROM 42 and the non-volatile memory 44. The ROM 42 stores a variety of programs to be executed by the CPU 41, data, and so on. The RAM 43 is used as a main storage section which is used for the CPU 41 to perform a variety of processes. The operation section 46 is configured by a mouse, a keyboard, and so on (not shown) to be operated by a user. The display section 45 is configured by a display such as a liquid crystal display. The print engine 47 is configured by a variety of mechanisms for printing images on recording sheets (for example, in a case of an inkjet system, an inkjet nozzle, a cartridge, a motor, a sheet conveying mechanism, and so on).

The USB I/F 48 basically has the same function as that of the USB I/F 28 of the client PC 3 for performing data communication with the client PC 3 through the USB cable 6 according to the USB standard. However, the USB I/F 48 of the second printer 12 has one USB connection jack 51. The network I/F 49 also has the same function and configuration as those of the network I/F 29 of the client PC 3. That is, the second printer 12 has a so-called a network printing function capable of printing images of print data transmitted through a LAN.

In the image information processing system 1 configured as described above, the client PC 3 performs a variety of data communication with each of the printers 11, 12, and 13 through USB interface. This data communication includes communication for transmitting print data to any one of the printers 11, 12, and 13, thereby printing images, communication for using the client PC 3 to perform a variety of setting of the printers 11, 12, and 13, communication for using the client PC 3 to acquire the set state, operating state, and the like of each of the printers 11, 12, and 13, etc.

This data communication is performed according to an "IPP-over-USB" standard. The IPP and the "IPP-over-USB" have been already described in brief, and they are known standards for implementing communication between an information processing apparatus and a printer, and thus they will not be described in detail.

(2) Software Configuration of Image Information Processing System

Figure 2:
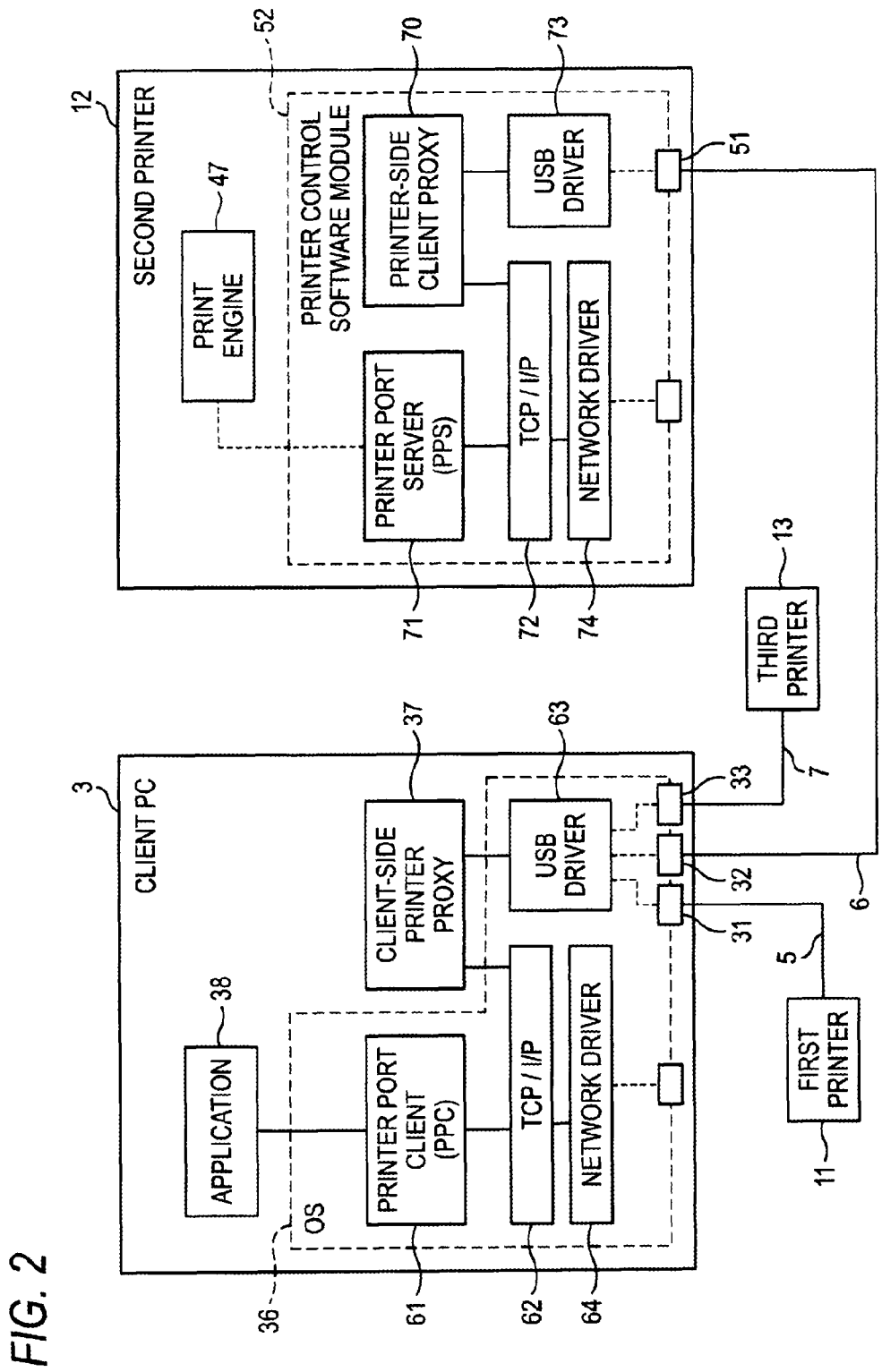
FIG. 2 is a functional block diagram illustrating the software configuration of the image information processing system.

Subsequently, the software configuration of the image information processing system 1 will be described with reference to FIG. 2. First, the software configuration of the client PC 3 will be described. As shown in FIG. 1, the client PC 3 has the OS 36, the client-side printer proxy 37, and the application 38 as software. More specifically, the OS 36 includes a printer port client (hereinafter, referred to as a PPC) 61, TCP/IP software 62, a USB driver 63, and a network driver 64. Each software is associated with a hierarchy of an OSI reference model roughly as follows. That is, the network driver 64 corresponds to a data link layer, an IP function of the TCP/IP software corresponds to a network layer, a TCP function and a UDP function of the TCP/IP software 62 correspond to a transport layer, the USB driver 63 corresponds to each layer from the data link layer to the transport layer as a whole, and the PPC 61 corresponds to a session layer. Also, the client-side printer proxy 37 corresponds to the session layer, and the application 38 corresponds to an application layer. Further, the USB driver 63 corresponds to an example of a transceiver section of an information processing apparatus of this disclosure.

The PPC 61 is software taking charge of the IPP. That is, the PPC 61 takes charge of determining a procedure for printing according to the IPP standard between the client PC 3 and a printer which is a communication partner. The PPC 61 determines which procedure is to be used to transmit print data, other data, or the like from the application 38 to a printer, and which procedure is to be used to perform a receiving process on data from a printer and transmit the data to the application 38, and thus performs data communication between the application 38 and the printer. More specifically, for example, in a case where print data is received from the application 38, the print data is stored in a predetermined frame according to the PPC (hereinafter, referred to as a PPC frame), and the PPC frame is transmitted to a lower layer protocol (the TCP/IP software 62 in the present embodiment). On the other hand, if a PPC frame transmitted from the printer is input through the TCP/IP software 62, data is read from the PPC frame and is transmitted to the application 38. Also, the PPC 61 corresponds to an example of a transmission/reception data processing section of the information processing apparatus of this disclosure, and the IPP and the TCP/IP correspond to an example of a protocol of this disclosure.

The TCP/IP software 62 is known software (a protocol stack) taking charge of processes associated with protocols of IP, TCP, and UDP. The USB driver 63 is known driver software for implementing data communication according to USB, and the network driver 64 is known driver software for implementing data communication through a LAN.

The client-side printer proxy 37 is software acting as a local host in the client PC 3, and acts as a printer (a server) as seen from the OS 36. That is, the client-side printer proxy 37 transmits data of a local host destination (a destination having an IP address "127.0.0.1") received from the TCP/IP software 62 to the USB driver 63, and then transmits data received from the USB driver 63 to the TCP/IP software 62. Also, the client-side printer proxy 37 corresponds to an example of a communication relaying program which is implemented by the information processing apparatus of this disclosure.

As a method of implementing data communication according to the "IPP-over-USB" standard while changing existing components (such as the OS) as little as possible, this disclosure focuses on the concept of a local host. That is, if a proxy using the local host is provided between the TCP/IP software 62 and the USB driver 63, and control is performed such that the proxy relays data, it is possible to implement data communication of the "IPP-over-USB" standard.

In a TCP/IP protocol, the IP address of a local host is predetermined to "127.0.0.1". This IP address "127.0.0.1" is an address for feeding back transmission data, transmitted from the application 38 for a network back, in the client PC, and is generally referred to as a loopback address.

The client-side printer proxy 37 registers the IP address "127.0.0.1" of the local host with respect to the TCP/IP software 62. Therefore, in a case where the application 38 requests the local host destination (the destination having the IP address "127.0.0.1") to transmit print data, the TCP/IP software 62 does not transmit the print data to a network but transmits the print data to the client-side printer proxy 37 serving as the local host. If receiving the print data from the TCP/IP software 62, the client-side printer proxy 37 transmits the print data to the USB driver 63 which transmits the print data by USB.

Also, the client-side printer proxy 37 manages association between the printers 11, 12, and 13 connected to the USB connection jacks 31, 32, and 33 and port numbers of the local host, respectively.

That is, the client-side printer proxy 37 sets the IP address to "127.0.0.1", and sets a port number for each USB connection jack, thereby setting an end point. Specifically, as shown in FIG. 3, a port number "50001" is set for a USB number "1" (corresponding to the USB connection jack 31, and a port number "50002" is set for a USB number "2" (corresponding to the USB connection jack 32, and a port number "50003" is set for to a USB number "3" (corresponding to the USB connection jack 33.

As a method of associating the USB numbers and the port numbers with each other, for example, it can be considered a method in which the client-side printer proxy 37 performs an exchange of information with the USB driver 63, thereby investigating the number of USB ports which are managed by the USB driver 63 (that is, the number of USB connection jacks) and a port number is set for each USB port (that is, for each USB connection jack). In the present embodiment, the associating according to this method will be mainly described. That is, in the present embodiment, the client-side printer proxy 37 generates a socket for each USB port as will be described below. A socket is well known as a standard application programming interface (API) which is used when an application uses a TCP/IP function, and thus will not be described in detail.

Also, as the method of associating the USB numbers and the port numbers, a variety of methods can be considered. For example, it can also be considered a method in which a user inputs the USB numbers and the port numbers to correspond in one-to-one correspondence by using a predetermined user interface (UI) screen for the associating in the client PC 3.

Since the USB numbers and the port numbers are associated with each other, the user can investigate the port number of an arbitrary USB port, for example, through the predetermined UI screen (the port number can be displayed). Further, if the USB numbers and the port numbers are associated with each other, the user can register an arbitrary USB printer (a printer subjected to USB connection) as a printer which can be used from the client PC 3. Specifically, for example, a screen for adding a printer may be displayed, and a TCP/IP port may be designated as a new printer, and the IP address of the printer (here, "127.0.0.1" indicating the local host) and a port number (for example, "50001") may be input. Also, all of the USB connection jacks 31, 32, and 33 (in other words, the USB ports) correspond to an example of a connection section of this disclosure.

Also, when the user controls a USB printer such that the USB printer prints a document or the like created by the application 38, the user can perform predetermined input operation for designating a desired USB printer such that the designated USB printer performs printing. Specifically, for example, a method of inputting a command "IPP://127.0.0.1: 50001/ipp" to designate a USB printer can be considered. If the port "50001" of the local host is designated as a USB port, which is corresponding to a printing destination, by that command, print data is input to a corresponding socket of the client-side printer proxy 37 through the TCP/IP software 62. On the basis of the port number "50001" corresponding to the socket, the client-side printer proxy 37 transmits the print data from a USB port corresponding to the port number "50001" by the USB driver 63.

Also, in this disclosure, since the client PC 3 has the plurality of USB connection jacks, as described above, arbitrary port numbers are set. However, in a case where there is one USB connection jack, a port number "631" known as a default port number of the IPP may be used.

By the way, since a port number is associated with each USB port, the user can designate an arbitrary USB printer and transmit print data to the designated USB printer. It is difficult for the user to easily specify a desired printer only by a port number. Moreover, it is troublesome for the user to input a command for designating a desired printer like in the above described example.

Therefore, the client-side printer proxy 37 has a mechanism for efficiently managing a plurality of USB printers, thereby making it easy for the user to select. Specifically, the client-side printer proxy 37 receives printer retrieval data (a multicast request which will hereinafter be referred to as a device search request) from the PPC 61, and requests a printer name from each USB port. Then, if a printer name is received as a response from a printer, the client-side printer proxy 37 sends back the printer name in association with a port number (and the IP address of the local host) to the PPC 61. The printer name corresponds to an example of apparatus information of this disclosure.

As described above, the client-side printer proxy 37 manages the port numbers in association with the USB numbers, and further manages the retrieved printer names in association with the USB numbers. That is, as shown in FIG. 3, the client-side printer proxy 37 holds management data in which a printer name and a port numbers are associated with each other for each USB port.

The IPP originally has a function of performing multicast for a network, thereby retrieving a printer connected to the network, and the PPC 61 takes that role. Therefore, if the local host destination performs that multicast, it is possible to retrieve printers using USB connection through the local host (that is, through the client-side printer proxy 37).

As described above, since a printer name and a port number are associated with each other for each USB, in a case where the user wants any USB printer to perform printing, the user can easily designate the desired USB printer on the basis of the printer name.

Also, the user may use a predetermined UI screen to issue the device search request for the local host (accordingly, for a USB connection printer) at an arbitrary timing. Alternatively, regardless of a request form the user, the client-side printer proxy 37 may periodically retrieve USB connection printers, and sends back the latest information to the PPC 61.

Subsequently, the software configuration of the second printer 12 will be described. The second printer 12 includes a printer-side client proxy 70, a printer port server (hereinafter, referred to as a PPS) 71, TCP/IP software 72, a USB driver 73, and a network driver 74 as software. If each piece of the software is associated with a hierarchy of an OSI reference model, the printer-side client proxy 70 and the PPS 71 correspond to a session layer. The hierarchies of the network driver 74, the TCP/IP software 72, and the USB driver 73 are the same as those of the client PC 3. Also, the USB driver 73 corresponds to an example of a transceiver section of an image processing apparatus of this disclosure.

The PPS 71 is software taking charge of the IPP in the second printer 12. That is, the PPS 71 takes charge of determining a procedure of processing a variety of printing-related data to be transmitted to and received from the client PC 3 which is a communication partner. A basic function of the PPS 71 is the same as that of the PPC 61 of the client PC 3, and it relays data between the print engine 47 and the TCP/IP software 72 according to the IPP standard. Also, the PPS 71 corresponds to an example of a transmission/reception data processing section of the image processing apparatus of this disclosure.

The TCP/IP software 72 is basically the same as the TCP/IP software 62 of the client PC 3, and the network driver 74 is basically the same as the network driver 64 of the client PC 3, and thus they will not be described. Also, a basic function of USB driver 73 taking charge of data communication according to the USB standard is the same as the USB driver 63 of the client PC 3. However, since the second printer 12 has one USB connection jack, the USB driver 63 controls USB communication with an apparatus (the client PC 3 in the present embodiment) connected to the one USB connection jack 51.

The printer-side client proxy 70 is software acting as a local host in the second printer 12, and acts as a client as seen from the PPS 71 or the TCP/IP software 72. That is, the printer-side client proxy 70 transmits data the TCP/IP software 72 of the local host destination (the destination having the IP address "127.0.0.1") received from the TCP/IP software 72 to the USB driver 73, and then transmits data received from the USB driver 73 to the TCP/IP software 72.

That is, similarly to the client-side printer proxy 37 of the client PC 3, the printer-side client proxy 70 is provided for implementing data communication of the "IPP-over-USB" standard. Also, the printer-side client proxy 70 corresponds to an example of a communication relaying program which is implemented by the image processing apparatus of this disclosure.

(3) Operation Example (Sequence) of Image Information Processing System 1

Subsequently, a basic operation example of the image information processing system 1 will be described with reference to FIG. 4. For example, if the user operates a predetermined UI of the application 38 of the client PC 3, thereby issuing a device search request for a USB connection printer, the PPC 61 issues a device search request for the USB connection printer addressed to the local host (that is, the client-side printer proxy 37). Then, the TCP/IP software 62 transmits the device search request to the client-side printer proxy 37.

If receiving the device search request from the PPC 61, the client-side printer proxy 37 issues a printer name request (inquiry) to each USB port. Specifically, first, the client-side printer proxy 37 inquires of the first printer 11 connected to the USB connection jack 31 about the printer name. Then, the printer-side client proxy 70 of the first printer 11 transmits the printer name of the first printer 11 (for example, "NPR-1234") as a response. If receiving the printer name as a response from the first printer 11, the client-side printer proxy 37 registers the received printer name as one management data item (see FIG. 3) and sends back the received printer name in association with a port number (50001) and an IP address ("127.0.0.1") to the PPC 61 through the TCP/IP software 62.

Similarly, the client-side printer proxy 37 inquires two printers 12 and 13 connected to the other two USB connection jacks 32 and 33 about their printer names. If receiving the responses, the client-side printer proxy 37 registers the printer names as management data, and it sends back the printer names in association with port numbers and IP addresses to the PPC 61.

If the USB connection printer names are returned from the client-side printer proxy 37, the PPC 61 collects them and sends back them as the search result to the application 38. The application 38 displays the search result, thereby presenting the latest information of USB connection printer to the user.

If the latest information of the USB connection printers is obtained by doing so, the user can easily select a USB connection printer for printing. Also, for example, if the user designates the second printer 12 (that is, a printer name "PR-3456" on a printer selection screen) and requests to print a document or the like created by the application 38, a printing request from the application 38 is transmitted from the PPC 61 to the client-side printer proxy 37 through the TCP/IP software 62. More specifically, the printing request is input from a socket, which is one of the sockets generated for each USB port and corresponds to the second printer 12, to the client-side printer proxy 37. If receiving the printing request addressed to the second printer 12, the client-side printer proxy 37 controls the USB driver 63 such that the printing request is transmitted to the second printer 12.

If the second printer 12 receives the printing request from the client PC 3 through USB interface, the printer-side client proxy 70 transmits the printing request to the PPS 71. At this time, as the transmission source, "127.0.0.1" is designated as the IP address, and the IPP default "631" is designated as the port number. If receiving the printing request, the PPS 71 outputs print data to the print engine 47 such that printing is performed. Then, if the printing is completed, the PPS 71 transmits a reception response addressed to the local host which is the printing request transmission source. The reception response is transmitted to the printer-side client proxy 70 through the TCP/IP software 72. The printer-side client proxy 70 controls the USB driver 73 such that the reception response is transmitted.

If the client PC 3 receives the reception response from the second printer 12 through USB interface, the client-side printer proxy 37 transmits the reception response to the PPC 61. On the basis of the reception response, the PPC 61 can display information representing that the printing has been completed by the second printer 12, on a predetermined UI screen.

(4) Processes of Client-side Printer Proxy 37 of Client PC 3

Figure 5B:
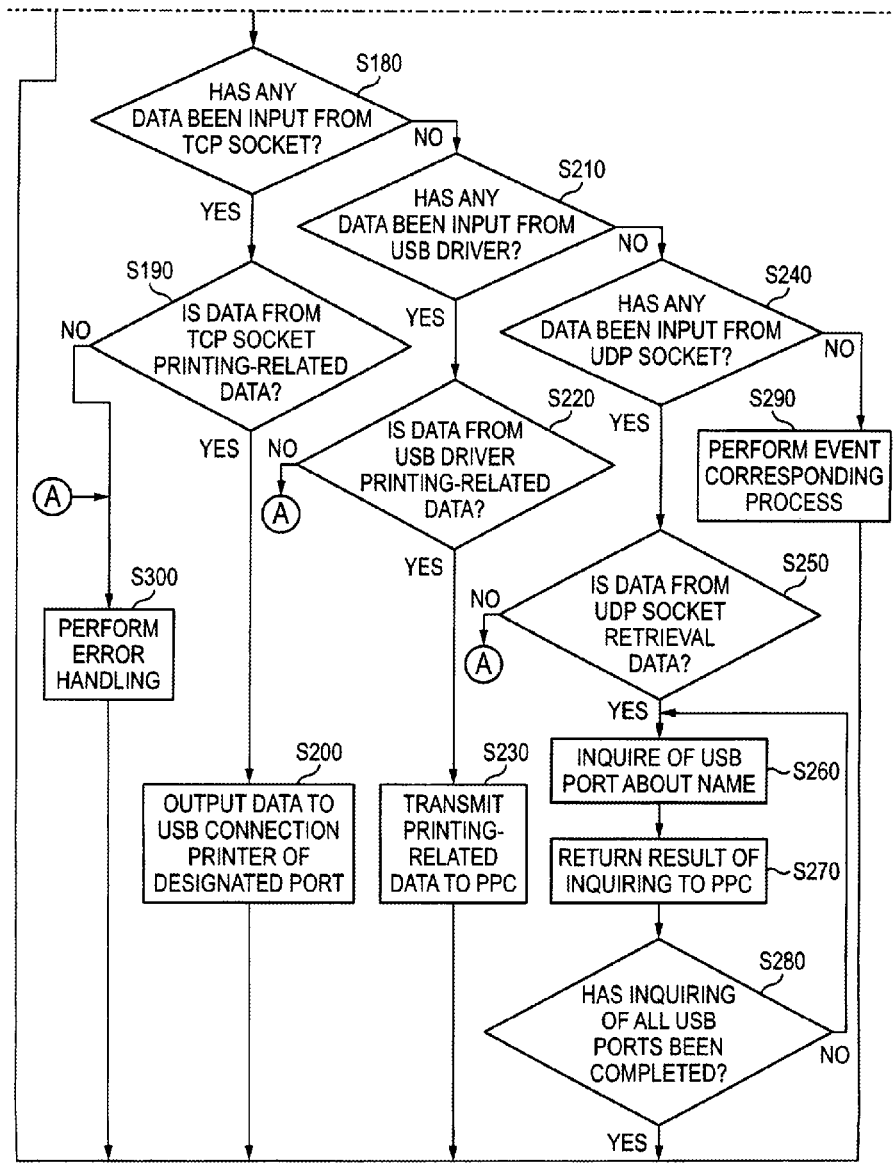
FIG. 5, which is composed of FIG. 5A and FIG. 5B, is a flow chart illustrating a client-side printer proxy process which is executed by the client PC.

Subsequently, the specific process contents of the client-side printer proxy 37 of the client PC 3 will be described with reference to FIG. 5, which is composed of FIG. 5A and FIG. 5B. After activation, the CPU 21 of the client PC 3 starts a client-side printer proxy process of FIG. 5A and FIG. 5B at a predetermined timing.

If starting the client-side printer proxy process of FIG. 5A, first, in processes of steps S110 to S130, the CPU 21 prepares TCP sockets. That is, in step S110, the CPU 21 generates a TCP socket by a command "socket( )". In step S120, the CPU 21 registers the IP address "127.0.0.1" in the TCP socket by a command "bind( )" and designates a port number with respect to any one USB port (USB connection jack). In step S130, the CPU 21 determines whether generating of sockets relative to all USB ports has been completed, and if the generating of the sockets has not been completed, the CPU 21 returns to step S110. In this way, the CPU 21 sequentially generates sockets for the USB ports, thereby completing the generating. Next, in step S140, the CPU 21 generates a UDP socket by a command "socket( )". In step S150, the CPU 21 registers a multicast address for printer retrieval "224.0.0.251" by a command "bind( )", and designates a port number "5353". In this way, a printer retrieval (device search) request is issued. Then, a corresponding UDP socket also becomes a multicast object of the device search.

If the processes of steps S110 to S150 are completed, in step S160, the CPU 21 performs socket connection preparation by a command "listen( )". Then, in step S170, the CPU 21 enters an event waiting state.

If any event occurs, in step S180, the CPU 21 determines whether that event is an event from a TCP socket, that is, whether data has been input from a TCP socket. In a case where data has been input from a TCP socket, in step S190, the CPU 21 determines whether the data from the TCP socket is printing-related data (such as a printing request including print data). If the data from the TCP socket is not printing-related data, the CPU 21 performs predetermined error handling in step S300, and returns to step S170. In a case where the data from the TCP socket is printing-related data, in step S200, the CPU 21 issues a command "usb_send( )" such that the printing-related data is output to a USB connection printer of a designated port (a port number associated with the TCP socket to which the data has been input). Then, the CPU 21 returns to step S170.

In a case where it is determined in step S180 that data has not been input from a TCP socket, in step S210, the CPU 21 determines whether the event is an event from the USB driver 63. In a case where data has been input from the USB driver 63, in step S220, the CPU 21 determines whether the data from the USB driver is printing-related data (for example, such as the above described reception response). If the data from the USB driver is not printing-related data, in step S300, the CPU 21 performs predetermined error handling, and returns to step S170. In a case where the data from the USB driver is printing-related data, in step S230, the CPU 21 issues a command "send( )" such that the printing-related data is transmitted to the PPC 61 through TCP/IP, and returns to step S170.

In a case where it is determined in step S210 that any data has not been input from the USB driver 63, in step S240, the CPU 21 determines whether the event is an event from the UDP socket, that is, whether data has been input from the UDP socket. In a case where data has been input from the UDP socket, in step S250, the CPU 21 determines whether the data from the UDP socket is retrieval data (a device search request). If the data from the UDP socket is not retrieval data, the CPU 21 performs predetermined error handling in step S300, and returns to step S170. In a case where the data from the UDP socket is retrieval data, in step S260, the CPU 21 inquires of any one USB port about the printer name of the USB connection printer. In step S270, the CPU 21 sends back the result of the inquiring, that is, the printer name transmitted as a response to the inquiring from the USB connection printer, which is the inquiring destination, through TCP/IP. In step S280, the CPU 21 determines whether inquiring of all USB ports about their printer names has been completed. If the inquiring is completed, the CPU 21 returns to step S260. In this way, the CPU 21 sequentially acquires the printer names of the USB connection printers If acquiring of the printer names of all USB connection printers is completed, the CPU 21 returns to step S170.

In a case where it is determined in step S240 that any data has not been input from the UDP socket, the CPU 21 performs a process corresponding to the occurred event in step S290, and returns to step S170.

(5) Processes of Printer-Side Client Proxy 70 of Second Printer 12

Subsequently, the specific process contents of the printer-side client proxy 70 of the second printer 12 will be described with reference to FIG. 6. After activation, the CPU 41 of the second printer 12 start a printer-side client proxy process of FIG. 6 at a predetermined timing.

Figure 6:
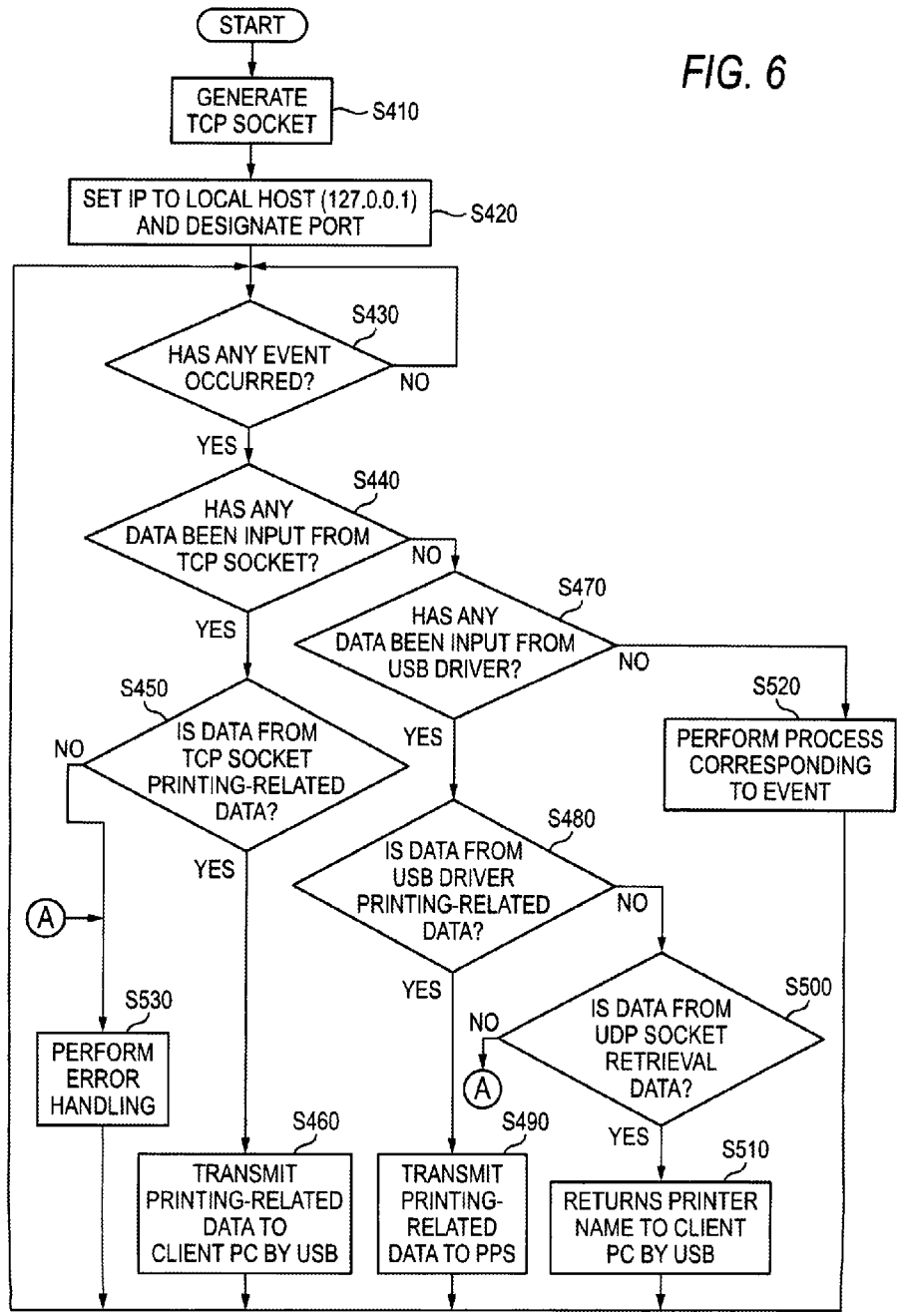
FIG. 6 is a flow chart illustrating a client-side printer proxy process which is executed by a printer.

If starting the printer-side client proxy process of FIG. 6, first, in step S410, the CPU 41 generates a TCP socket by a command "socket( )". In step S420, the CPU 41 registers the IP address "127.0.0.1" of the local host in the TCP/IP software 72 by a command "bind( )", and designates the port number "631" for the USB port (USB connection jack). Then, in step S430, the CPU 41 enters an event waiting state.

If any event occurs, in step S440, the CPU 41 determines whether that event is an event from a TCP socket, that is, whether data has been input from a TCP socket. In a case where data has been input from a TCP socket, in step S190, the CPU 21 determines whether the data from the TCP socket is printing-related data. If the data from the TCP socket is not printing-related data, the CPU 21 performs predetermined error handling in step S530, and returns to step S430. In a case where the data from the TCP socket is printing-related data, in step S460, the CPU 41 issues a command "usb_send( )" such that the printing-related data is transmitted to the client PC 3 through USB interface and returns to step S430.

In a case where it is determined in step S440 that data has not been input from a TCP socket, in step S470, the CPU 41 determines whether the event is an event from the USB driver 73. In a case where data has been input from the USB driver 73, in step S480, the CPU 41 determines whether the data from the USB driver is printing-related data. In a case where the data from the USB driver is printing-related data, the CPU 41 transmits the printing-related data to the PPS 71 through TCP/IP by a command "send( )" in step S490, and returns to step S430.

In a case where the data from the USB driver is not printing-related data in step S480, in step S500, the CPU 41 determines whether the data from the USB driver 73 is retrieval data (a device search request). If the data from the USB driver 73 is not retrieval data, the CPU 41 performs predetermined error handling in step S530, and returns to step S430. In a case where the data from the USB driver 73 is retrieval data, the CPU 41 sends back the printer name of the second printer 12 to the client PC 3 through USB interface, and returns to step S430.

In a case where it is determined in step S470 that any data has not been input from USB, the CPU 41 performs a process correspond to the occurred event in step S520, and returns to step S430.

(6) Effects of Embodiment and Others

As described above, in the image information processing system 1 of the present embodiment, since the client PC 3 includes the client-side printer proxy 37 for conversion (relay) between TCP/IP and USB, the client PC 3 acts as the local host. That is, the client-side printer proxy 37 has the local host address "127.0.0.1", and acts as a network printer. Meanwhile, since each of the printers 11, 12, and 13 includes the printer-side client proxy 70 for conversion (relay) between TCP/IP and USB, each of the printers 11, 12, and 13 acts as a local host. That is, each of the printers 11, 12, and 13 has a local host address "127.0.0.1", and acts as a network client.

Then, if a device search request is issued in the client PC 3, the device search request is also input to the client-side printer proxy 37 serving as a local host. If receiving the device search request, the client-side printer proxy 37 sequentially inquires of the USB connection printers about their printer names, and sends back the results of the inquiring in association with the port numbers and the IP addresses to the PPC 61. Also, the IP addresses are a common address "127.0.0.1". However, the printer names and the port numbers are different depending on the USB connection printers.

According to this configuration, if print data addressed to any one USB connection printer is transmitted from the application 38 of the client PC 3, the print data is processed according to the IPP by the PPC 61, and is transmitted to the client-side printer proxy 37. The client-side printer proxy 37 transmits the received print data to the USB connection printer of the corresponding port number. That is, the client-side printer proxy 37 transmits the print data of the IPP standard to the printer through USB interface.

Therefore, according to the image information processing system 1 of the present embodiment, it is possible to transmit and receive data of the IPP standard through USB interface according to the "IPP-over-USB" standard while suppressing modifications on existing software (for example, the PPC 61) for transmitting and receiving data by the IPP.

In the current draft of the "IPP-over-USB" standard, any specific mechanism for connecting IPP and USB is not defined, and any specific method or the like for connecting a plurality of printers by USB and properly using the printers is not mentioned. In order to handle this situation, since proxies for relaying TCP/IP and USB are provided to both the client-side and the printer-side like in the present embodiment, it is possible to specifically and easily implement data communication according to the "IPP-over-USB" standard.

Further, in the present embodiment, since a printer name and a port number are individually managed in association with each USB connection printer, the user can easily and surely designate a desired USB connection printer.

(7) Modifications

It goes without saying that embodiments of this disclosure are not limited to the above described embodiment, but can use various forms as long as they belong to the technical scope of this disclosure.

For example, in the above described embodiment, as the own-device address for feeding back transmission data in the image processing apparatus, the local host address "127.0.0.1" which is general as a own-device address (loopback address) in the TCP/IP protocol has been exemplified; however, this address is merely an example. With respect to how to specifically set the own-device address, it is possible to appropriately determine it according to a corresponding protocol or the like. For example, in a case where the OS supports any other address as the own-device address, the corresponding address may be used as the own-device address. Also, for example, an address family such as AF_UNIX (registered as a trade mark) or the like which a BSD socket is supporting can be used.

Also, in the above described embodiment, as the image processing apparatus of this disclosure, a printer has been exemplified. However, the image processing apparatus of this disclosure is not limited to an apparatus configured as a single printer, and may be an apparatus having not only a printer function (printing function) but also other functions.

Also, this disclosure is not limited to the application to data communication between the above described client PC 3 and the printers 11, 12, and 13. That is, this disclosure can be applied to a variety of information processing systems configured to be able to data communication between an information processing apparatus (client) and a server through a predetermined communication interface by a particular protocol and be able to perform transmission/reception according to the particular protocol even by using a different method of communication interface.

What is claimed is:

1. A non-transitory computer-readable medium storing instructions executable by a computer of an information processing apparatus, the information processing apparatus comprising:
   a transceiver configured to communicate to an image processing apparatus through a first communication interface, the first communication interface being a USB interface;
   at least one connection section to connect with the first communication interface; and
   a processor configured to process transmission or reception data, the data being transmitted to and received from the image processing apparatus by execution of an application program, according to a particular protocol in accordance with transmission or reception through a second communication interface different from the first communication interface, the second communication interface being a network interface,
   wherein the instructions, when executed by the processor, cause the information processing apparatus to:
   register a loopback address, which is set in the information processing apparatus, in association with a port number representing each connection section;
   determine whether a transmission destination address of the transmission data is the loopback address;
   control, in a case where the transmission destination address of the transmission data is the loopback address, the connection section corresponding to the associated port number and the transceiver to transmit the transmission data through the first communication interface to the image processing apparatus;
   control, in a case where the transmission destination address of the transmission data is not the loopback address, the transceiver to transmit the transmission data through the second communication interface instead of the first communication interface;
   in a case where a retrieval request for apparatus information of the image processing apparatus connected to the connection section is received, request the image processing apparatus connected to the connection section to provide the apparatus information representing the image processing apparatus; and
   in a case where the apparatus information is received from the image processing apparatus through the connection section in response to an apparatus information request, process a response to the retrieval request, in which the received apparatus information is associated with a port number corresponding to the connection section.

2. The non-transitory computer-readable medium according to claim 1, the instructions, when executed, further causing the information processing apparatus to:
   in a case where the data according to the protocol is received from the image processing apparatus through the first communication interface by the transceiver, process the data according to the protocol.

3. The non-transitory computer-readable medium according to claim 1,
   wherein the information processing apparatus includes a plurality of connection sections to connect with the first communication interface, and
   wherein the information processing apparatus registers the loopback address in association with the port number for each connection section, individually.

4. The non-transitory computer-readable medium according to claim 1,
   wherein the information processing apparatus includes a plurality of the connection sections to connect with the first communication interface,
   wherein each image processing apparatus connected with each connection section is requested to provide the apparatus information, and
   wherein the information processing apparatus is further caused to process the response, in which the received apparatus information associates with a port number corresponding to the corresponding connection section for each connection section individually.

5. An information processing apparatus including:
   a transceiver configured to communicate to an image processing apparatus through a first communication interface, the first communication interface being a USB interface;
   at least one connection section to connect with the first communication interface;
   a processor configured to process transmission or reception data, the data being transmitted to and received from the image processing apparatus by execution of an application program, according to a particular protocol in accordance with transmission/reception through a second communication interface different from the first communication interface, the second communication interface being a network interface; and
   memory storing instructions that, when executed by the processor, cause the information processing apparatus to:
   register a loopback address, which is set in the image processing apparatus, in association with a port number representing each connection section;
   determine whether a transmission destination address of the transmission data is the loopback address;
   control, in a case where the transmission destination address of the transmission data is the loopback address, the connection section corresponding to the associated port number and the transceiver to transmit the transmission data through the first communication interface to the image processing apparatus;
   control, in a case where the transmission destination address of the transmission data is not the loopback address, the transceiver to transmit the transmission data through the second communication interface instead of the first communication interface;
   in a case where a retrieval request for apparatus information of the image processing apparatus connected to the connection section is received, request the image processing apparatus connected to the connection section to provide the apparatus information representing the image processing apparatus; and
   in a case where the apparatus information is received from the image processing apparatus through the connection section in response to an apparatus information request, process a response to the retrieval request, in which the received apparatus information is associated with a port number corresponding to the connection section.

6. An image processing apparatus including:

a transceiver configured to communicate to an information processing apparatus through a first communication interface, the first communication interface being a USB interface;

a connection section configured to connect with the first communication interface;

a processor configured to process data, the data being transmitted to and received from the information processing apparatus according to a particular protocol in accordance with transmission or reception through a second communication interface different from the first communication interface, the second communication interface being a network interface; and memory storing instructions that, when executed by the processor, causing the image processing apparatus to:

register a loopback address, which is set in the image processing apparatus;

determine whether a transmission destination address of the transmission data is the loopback address;

control, in a case where the transmission destination address of the transmission data is the loopback address, the connection section and the transceiver to transmit the transmission data through the first communication interface to the image processing apparatus;

control, in a case where the transmission destination address of the transmission data is not the loopback address, the transceiver to transmit the transmission data through the second communication interface instead of the first communication interface; and in a case where the information processing apparatus receives a retrieval request for apparatus information of the image processing apparatus connected to the connection section, receive, from the information processing apparatus, a request to provide the apparatus information representing the image processing apparatus, wherein the apparatus information is configured to, after being provided to the information processing apparatus in response to the retrieval request, be processed by the information processing apparatus, the apparats information being associated with a port number corresponding to the connection section.

* * * * *